United States Patent
Zou

(10) Patent No.: US 12,537,960 B2
(45) Date of Patent: Jan. 27, 2026

(54) METHOD AND APPARATUS FOR ESTIMATING MOTION VECTOR OF INTER-FRAME CODING

(71) Applicant: Beijing Baidu Netcom Science Technology Co., Ltd., Beijing (CN)

(72) Inventor: Jian Zou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 44 days.

(21) Appl. No.: 18/749,540

(22) Filed: Jun. 20, 2024

(65) Prior Publication Data

US 2024/0430434 A1    Dec. 26, 2024

(30) Foreign Application Priority Data

Aug. 4, 2023    (CN) .......................... 202310980300.X

(51) Int. Cl.
  *H04N 19/119*  (2014.01)
  *H04N 19/137*  (2014.01)
  *H04N 19/154*  (2014.01)

(52) U.S. Cl.
  CPC ......... *H04N 19/137* (2014.11); *H04N 19/119* (2014.11); *H04N 19/154* (2014.11)

(58) Field of Classification Search
  CPC .. H04N 19/119; H04N 19/137; H04N 19/147; H04N 19/154
  See application file for complete search history.

(56) References Cited

U.S. PATENT DOCUMENTS

| | | | |
|---|---|---|---|
| 10,560,718 B2 * | 2/2020 | Lee | H04N 19/56 |
| 10,721,489 B2 * | 7/2020 | Chen | H04N 19/139 |
| 11,109,057 B2 * | 8/2021 | Lin | H04N 19/186 |
| 11,477,477 B2 * | 10/2022 | Chen | H04N 19/52 |

OTHER PUBLICATIONS

A fast HEVC transcoding based on content modeling and early termination; Peixoto; 2013; (Year: 2013).*
Adaptive competition for motion vector prediction in Multi-view video coding; Ryu—2011; (Year: 2011).*

* cited by examiner

*Primary Examiner* — Luis Perez-Fuentes
(74) *Attorney, Agent, or Firm* — Knobbe, Martens, Olson & Bear, LLP

(57) ABSTRACT

A method and apparatus for predicting motion vector for inter-frame encoding are provided. An implementation scheme of the method includes: acquiring first and second sets of motion vectors; dividing, in response to the number of valid adjacent PUs being greater than or equal to a preset number, the second set of motion vectors into at least one motion vector subset; calculating a correlation between the first set of motion vectors and each motion vector subset respectively, to obtain a priority of each adjacent PU; calculating, sequentially according to the priority in descending order, a rate distortion based on a motion vector of each adjacent PU, and stop calculating until a rate distortion smaller than a predetermined threshold is obtained; and determining a motion vector of an adjacent PU used when the rate distortion smaller than the predetermined threshold is obtained as the motion vector of the current PU.

20 Claims, 5 Drawing Sheets

METHOD AND APPARATUS FOR ESTIMATING MOTION VECTOR OF INTER-FRAME CODING

CROSS-REFERENCE TO RELATED APPLICATIONS

This application claims the priority from Chinese Patent Application No. 202310980300.X, filed in the National Intellectual Property Administration (CNIPA) on Aug. 4, 2023, the contents of which are hereby incorporated by reference in their entirety.

TECHNICAL FIELD

The present disclosure relates to the field of artificial intelligence, in particular to cloud computing, video coding and decoding, and media cloud technology, which may be applied in intelligent cloud scenarios.

BACKGROUND

HEVC (High Efficiency Video Coding) is a new generation of video coding and compression standard that saves nearly 50% of the bit rate compared to the previous generation of H.264/AVC standard at the same definition. In the future, HEVC may be widely used in fields related to video compression, such as live streaming or video on-demand. It mainly consists of major technologies such as prediction, transform, quantization, loop filtering, or entropy coding. Here, prediction is an important module of encoders, which is divided into intra-frame prediction and inter-frame prediction. Intra-frame prediction refers to a method of using reconstructed pixel values of encoded image blocks in the same image frame to predict to-be-encoded pixel blocks according to a certain approach. Inter-frame prediction refers to a method of using pixel blocks in encoded forward or backward reference frames to predict to-be-encoded pixel blocks, where, inter-frame prediction may use a block-by-block matching method to acquire the best matching block in the reference frames, a process known as motion estimation. The motion estimation process may output displacement information of the matching block relative to a current to-be-encoded image block, which is called a motion vector, and is generally represented by two vector values in the x and y directions. Experiments have confirmed that the motion estimation process takes up a huge amount of computation and is the most time-consuming part in coding and transcoding. In addition to motion estimation, HEVC also employs a prediction technology for motion vectors, also known as merge MV (merge motion vector) technology, which may use an mv of an adjacent block that has already been encoded to predict the mv of the current to-be-encoded block, and this technology may enrich coding modes of inter-frame prediction for HEVC. The merge MV technology requires multiple performances of rate-distortion calculations to determine an optimal merge MV, and is therefore computationally intensive, resulting in slow coding.

SUMMARY

Embodiments of the present disclosure provide a method and apparatus for predicting motion vector for inter-frame encoding, a device, a storage medium, and a computer program product.

According to a first aspect of the present disclosure, a method for predicting motion vector for inter-frame encoding is provided, including: acquiring a first set of motion vectors and a second set of motion vectors, where the first set of motion vectors includes a motion vector of a current PU (prediction unit) and motion vectors of PUs, that are at identical locations as the current PU, in a predetermined number of reference frames, and the second set of motion vectors includes a motion vector of at least one adjacent PU of the current PU and motion vectors of PUs, that are at identical locations as the at least one adjacent PU, in the predetermined number of reference frames; dividing, in response to the number of valid adjacent PUs being greater than or equal to a preset number, the second set of motion vectors into at least one motion vector subset according to locations of the PUs; calculating a correlation between the first set of motion vectors and each motion vector subset respectively, and determining a priority of an adjacent PU corresponding to each motion vector subset according to the correlation in descending order; calculating, sequentially according to the priority in descending order, a rate distortion based on a motion vector of each adjacent PU, and stop calculating until a rate distortion smaller than a predetermined threshold is obtained; and determining a motion vector of an adjacent PU used when the rate distortion smaller than the predetermined threshold is obtained as the motion vector of the current PU.

According to a second aspect of the present disclosure, an apparatus for predicting motion vector for inter-frame encoding is provided. The apparatus includes: an acquisition unit, configured to acquire a first set of motion vectors and a second set of motion vectors, wherein the first set of motion vectors comprises a motion vector of a current PU and motion vectors of PUs, that are at identical locations as the current PU, in a predetermined number of reference frames, and the second set of motion vectors comprises a motion vector of at least one adjacent PU of the current PU and motion vectors of PUs, that are at identical locations as the at least one adjacent PU, in the predetermined number of reference frames; a division unit, configured to divide, in response to a number of valid adjacent PUs being greater than or equal to a preset number, the second set of motion vectors into at least one motion vector subset according to locations of the PUs; a first calculation unit, configured to calculate a correlation between the first set of motion vectors and each motion vector subset respectively, and determine a priority of an adjacent PU corresponding to each motion vector subset according to the correlation in descending order; a second calculation unit, configured to calculate, sequentially according to the priority in descending order, a rate distortion based on a motion vector of each adjacent PU, and stop calculating until a rate distortion smaller than a predetermined threshold is obtained; and a determination unit, configured to determine a motion vector of an adjacent PU used when the rate distortion smaller than the predetermined threshold is obtained as the motion vector of the current PU.

According to a third aspect, some embodiments of the present disclosure provide an electronic device. The electronic device includes: at least one processor; and a memory, communicatively connected to the at least one processor; where the memory stores instructions executable by the at least one processor, the instructions being executed by the at least one processor to enable the at least one processor to perform the method according to any one of the implementations described at the first aspect.

According to a fourth aspect, some embodiments of the present disclosure provide an non-transitory computer readable storage medium, which stores computer instructions thereon, the computer instructions, when executed by a computer, causes the computer to perform the method according to any one of the implementations described at the first aspect.

According to a fourth aspect, some embodiments of the present disclosure provide a computer program product, comprising a computer program, the computer program, when executed by a processor, implements the method according to any one of the implementations described at the first aspect.

Embodiments of the present disclosure provide a method and apparatus for predicting motion vector for inter-frame encoding, use MV(s) (Motion Vector) of adjacent PU(s) to calculate MV information of the current PU. Using the correlation between the MV(s) of the adjacent PU(s) at the identical location(s) as the current PU in multiple frames, instead of traversing and calculating the rate distortion of the MVs of all adjacent PUs, it is only necessary to find the MV having the rate distortion smaller than the predetermined threshold from those having the highest correlation, and calculations may be terminated early, thus reducing the amount of computation and improving the speed of coding.

It should be understood that the content described in this section is not intended to identify critical or important features of embodiments of the present disclosure, and is not used to limit the scope of the present disclosure. Other features of the present disclosure will become readily comprehensible through the following description.

BRIEF DESCRIPTION OF THE DRAWINGS

The accompanying drawings are used for better understanding of this solution, and do not constitute a limitation to the present disclosure.

DETAILED DESCRIPTION OF EMBODIMENTS

Example embodiments of the present disclosure are described below with reference to the accompanying drawings, where various details of embodiments of the present disclosure are included to facilitate understanding, and should be considered merely as examples. Therefore, those of ordinary skills in the art should realize that various changes and modifications may be made to embodiments described herein without departing from the scope and spirit of the present disclosure. Similarly, for clearness and conciseness, descriptions of well-known functions and structures are omitted in the following description.

Figure 1:
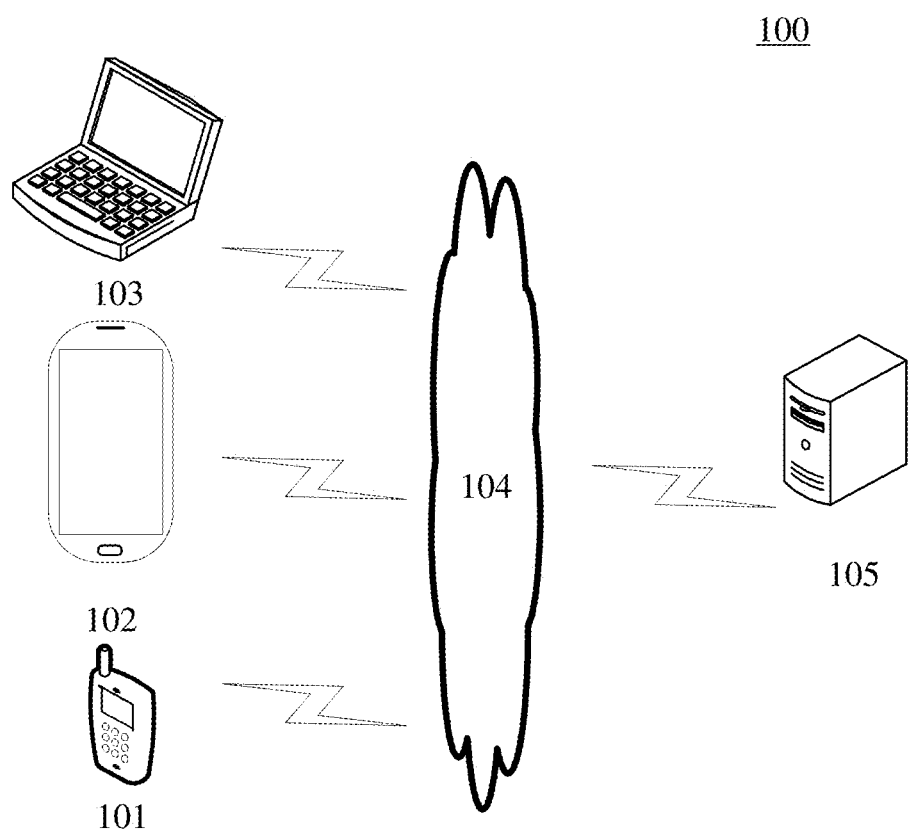
FIG. 1 is an example system architecture diagram in which an embodiment of the present disclosure may be applied.

FIG. 1 illustrates an example system architecture 100 in which a method for predicting motion vector for inter-frame encoding or an apparatus for predicting motion vector for inter-frame encoding according to embodiments of the present disclosure may be applied.

As shown in FIG. 1, the system architecture 100 may include terminal device(s) 101, 102, 103, a network 104, and a server 105. The network 104 serves as a medium providing a communication link between the terminal device(s) 101, 102, 103 and the server 105. The network 104 may include various types of connections, for example, wired or wireless communication links, or optical fiber cables.

A user may use the terminal device(s) 101, 102, 103 to interact with the server 105 via the network 104, to receive or send messages, etc. Various communication client applications may be installed on the terminal device(s) 101, 102, 103, such as a video playback application, a web browser application, a shopping application, a search application, an instant messaging tool, an email client, or a social platform software.

The terminal device(s) 101, 102, 103 may be hardware or software. When the terminal device(s) 101, 102, 103 are hardware, they may be a variety of electronic devices having a display screen and supporting video playback, including, but not limited to, a smartphone, a tablet, an e-book reader, an MP3 player (Moving Picture Experts Group Audio Layer III), an MP4 (Moving Picture Experts Group Audio Layer IV) player, a laptop, a desktop computer, or the like. When the terminal device(s) 101, 102, 103 are software, they may be installed in the electronic devices listed above. The terminal device(s) 101, 102, 103 may be implemented as a plurality of software or software modules (e.g., for providing distributed services) or as a single software or software module, which will not be limited herein.

The server 105 may be a server that provides various services, such as a backend video server that provides compression coding functionality for videos displayed on the terminal device(s) 101, 102, 103. The backend video server may process such as analyze received data such as video coding requests and feed HEVC-encoded videos back to the terminal devices, then the terminal device(s) may decode the videos.

It should be noted that the server may be hardware or software. When the server is hardware, it may be implemented as a distributed server cluster consist of multiple servers, or as a single server. When the server is software, it may be implemented as a plurality of software or software modules (e.g., a plurality of software or software modules used to provide distributed services), or as a single software or software module, which will not be limited herein. The server may also be a server for a distributed system, or a server incorporating a blockchain. The server may also be a cloud server, or an intelligent cloud computing server with artificial intelligence technology or an intelligent cloud host.

It should be noted that the method for predicting motion vector for inter-frame encoding provided in embodiments of the present disclosure is generally performed by the server 105, and accordingly, the apparatus for predicting an motion vector for inter-frame encoding is generally provided in the server 105.

It should be appreciated that the numbers of the terminal devices, the networks and the servers in FIG. 1 are merely illustrative. Any number of terminal devices, networks and servers may be provided depending on implementation needs.

Figure 2:
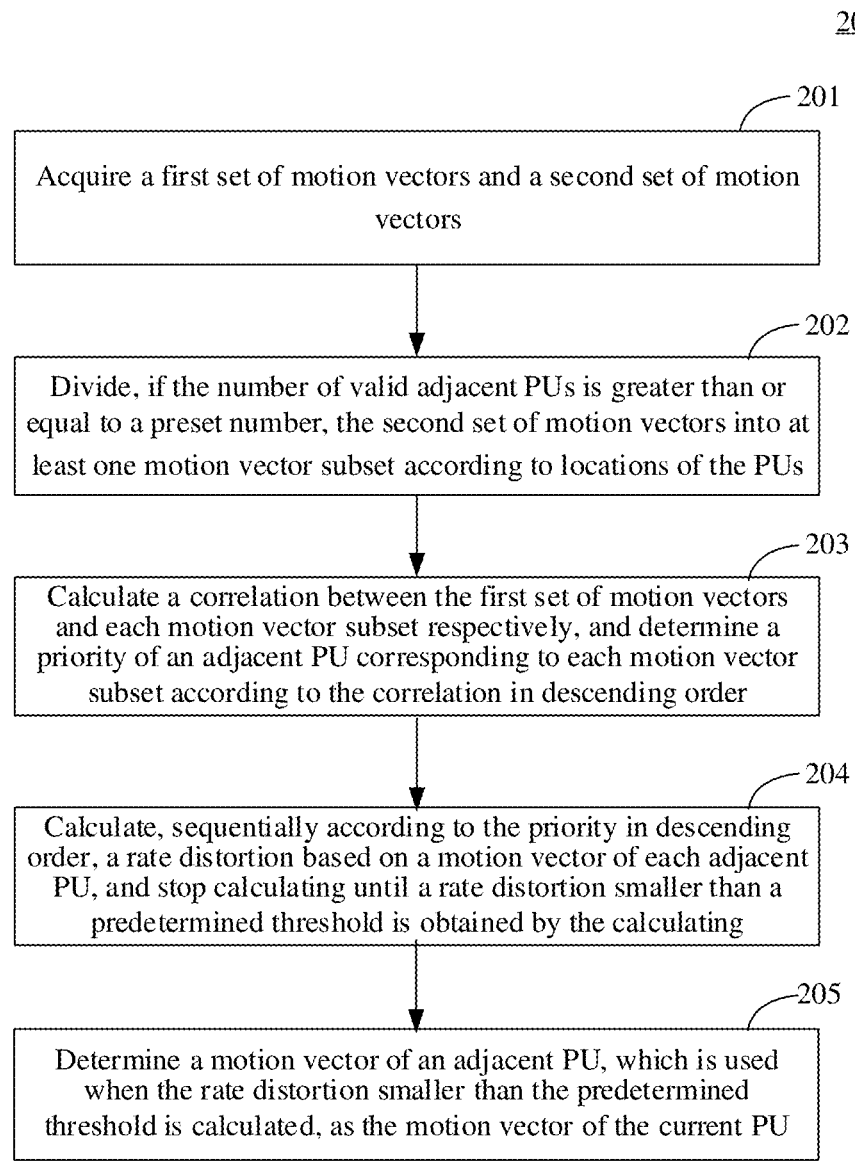
FIG. 2 is a flowchart of a method for predicting motion vector for inter-frame encoding according to an embodiment of the present disclosure.

With further reference to FIG. 2, a flow 200 of a method for predicting motion vector for inter-frame encoding according to an embodiment of the present disclosure is illustrated. The method for predicting an inter-frame encoded motion vector includes the following steps:

Step 201, acquiring a first set of motion vectors and a second set of motion vectors.

In the present embodiment, an executing body (e.g., the server shown in FIG. 1) of the method for predicting motion vector for inter-frame encoding may acquire a set of motion vectors of different PUs known to be calculated for each frame. A current PU is a PU for which a MV is to be calculated. Calculating the MV of the current PU needs to intercept a first set of motion vectors and a second set of motion vectors from the above set of motion vectors. Here, the first set of motion vectors includes the motion vector of the current PU and motion vectors of PUs at identical locations as the current PU in a predetermined number of reference frames, and the second set of motion vectors includes a motion vector of an adjacent PU adjacent to the current PU and motion vectors of PUs at identical locations as the adjacent PU in the predetermined number of reference frames.

Figure 3A:
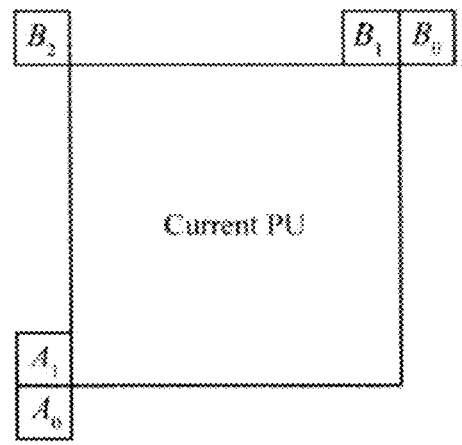
FIGS. 3a-3c are schematic diagrams of an application scenario of the method for predicting motion vector for inter-frame encoding according to an embodiment of the present disclosure.

Merge mode is an inter-frame prediction mode in the H.265 standard, which uses information of adjacent MVs adjacent to the current PU in time domain and space domain to calculate the MV information of the current PU. It may build a MV candidate list for the current PU, in which there are up to five candidate MVs (and their corresponding reference images), MVs of adjacent PUs are stored in the candidate MVs, and positional relationships between the adjacent PUs and the current PU are as shown in FIG. 3*a*. Traversing the five candidate MVs, a MV having the smallest rate distortion cost is selected as an optimal MV. If the codec builds the candidate list in same way, the encoder only needs to transmit an index of the optimal MV in the candidate list. The building of the MV candidate list includes two types: the space domain and the time domain, and for B Slice, a combinatorial list approach is also included.

The first set of motion vectors and the second set of motion vectors in the present embodiment are space-domain motion vectors.

An initial value of the motion vector of the current PU may be set to be a motion vector of a PU at the identical location in a previous reference frame.

Step 202, dividing, if the number of valid adjacent PUs is greater than or equal to a preset number, the second set of motion vectors into at least one motion vector subset according to locations of the PUs.

In the present embodiment, in the adjacent PUs, only those for which mv has been calculated are the valid adjacent PUs, otherwise they are invalid adjacent PUs. If the number of valid adjacent PUs is too small, the MV cannot be calculated using subsequent steps. The preset number may be set to be 4. The preset number may also be set based on parameters such as network latency, the larger the preset number, the larger the amount of computation, and the more coding time is required. For excess network latency, try to set a small preset number.

The second set of motion vectors may be grouped according to the locations of the PUs, where each group corresponds to one motion vector subset. For example, as shown in FIG. 3*a*, for easy memorization, the grouping is performed according to identifications in the space-domain candidate list of merge MV to obtain groups $A_1$, $A_0$, $B_1$, and $B_0$, retaining the MVs of the adjacent PUs respectively to different subgroups.

Step 203, calculating a correlation between the first set of motion vectors and each motion vector subset respectively, and determining a priority of an adjacent PU corresponding to each motion vector subset according to the correlation in descending order.

In the present embodiment, a first motion vector and a second motion vector corresponding to respective frames may be spliced sequentially according to a chronological order of the frames, and then converted into one-dimensional vectors after being spliced, and then a correlation between two one-dimensional vectors may be calculated by using an algorithm with a predetermined correlation coefficient. The correlation coefficient may include Pearson correlation coefficient, Spearman correlation coefficient, Kendall correlation coefficient, or the like.

Each motion vector subset corresponds to one adjacent PU, and an adjacent PU corresponding to a motion vector subset having high correlation is set to have a high priority, e.g., a motion vector subset corresponding to group $A_1$ has the highest correlation, and an adjacent PU corresponding to group $A_1$ has the highest priority.

Step 204, calculating, sequentially according to the priority in descending order, a rate distortion based on a motion vector of each adjacent PU, and stop calculating until a rate distortion smaller than a predetermined threshold is obtained by the calculating.

In the present embodiment, the present solution differs from existing technology in that, instead of traversing all motion vector subsets to calculate the rate distortion, the present solution starts calculating the rate distortion from the motion vector of the PU having high priority (corresponding to the motion vector subset having high correlation), and to stop calculating when the rate distortion smaller than the predetermined threshold is found. For example, the adjacent PU corresponding to group $A_1$ has the highest priority, the rate distortion is first calculated based on the MV of the adjacent PU corresponding to group $A_1$, and if the obtained rate distortion is smaller than the predetermined threshold, there is no need to further calculate the rate distortion based on the MVs of the adjacent PUs corresponding to group $A_0$, group $B_1$, and group $B_0$, and the amount of computation may be greatly reduced.

Rate distortion optimization is a key technology in video coding, and selecting an optimal coding parameter using rate distortion optimization is the key to ensure the efficiency of video coding. Embodiments of the present disclosure may use a Lagrangian optimization method to calculate the rate distortion. The Lagrangian optimization method is the most common and most powerful optimization tool in video rate distortion, thus detailed description thereof will be omitted.

Step 205, determining a motion vector of an adjacent PU, which is used when the rate distortion smaller than the predetermined threshold is calculated, as the motion vector of the current PU.

In the present embodiment, the motion vector of the adjacent PU, which is used when the rate distortion smaller than the predetermined threshold is calculated, may be regarded as an optimal merge MV. It is not necessary to calculate the rate distortion of the MVs of all adjacent PUs, and it is sufficient to find the motion vector of the adjacent PU which is used when the rate distortion smaller than the predetermined threshold is calculated. In this regard, the found motion vector may be used as the motion vector of the current PU. As coding continues subsequently, the motion vector of the current PU may be used as the motion vector of an adjacent PU of another PU.

Complete the inter-frame prediction process and save the MV, then go back to step 201, until computation of all the PUs in the current frame is completed. The other processes of the HEVC encoder remain the same, completing the transform, quantization, loop filtering, and entropy coding processes.

The method provided in the above embodiment of the present disclosure uses data correlation to reduce the amount of computation of merge MV.

In some alternative implementations of the present embodiment, before calculating the correlation between the first set of motion vectors and each motion vector subset respectively, the method further includes: calculating an average value of the motion vectors of the PUs, which are at the identical locations as the current PU, in the predetermined number of reference frames as the motion vector of the current PU. Compared with adopting only the motion vector of the PU at the identical location in the previous one reference frame, adopting the average value of the motion vectors of the PUs at the identical locations in multiple reference frames is smoother, and can obtain encoded videos of a higher quality.

In some alternative implementations of the present embodiment, the calculating a correlation between the first set of motion vectors and each motion vector subset respectively, includes: for each motion vector subset, converting, according to a predetermined order, motion vectors in the motion vector subset into a one-dimensional first vector, converting, according to the predetermined order, the first set of motion vectors into a one-dimensional second vector, and calculating a correlation between the first vector and the second vector according to a Pearson algorithm.

The Pearson correlation coefficient is a method for measuring a linear correlation strength between two variables. It takes values between $-1$ and $+1$, in which 0 represents no correlation, a negative value is a negative correlation, and a positive value is a positive correlation. It is obtained by calculating a quotient of a covariance of the two variables and a product of standard deviations of the two variables. In simple terms, the Pearson correlation coefficient is a centring of values of the vectors, i.e., an average value of elements is subtracted for all dimensions in the two vectors, and the average value of all dimensions after the centring is essentially 0; a cosine distance is then obtained for the centring result.

Suppose there are two variables X and Y with the following data:

X: [1, 2, 3, 4, 5]
Y: [2, 4, 1, 6, 5]

First, the average values and the standard deviations of the two variables need to be calculated.

The average value of X is:

$$\overline{X} = (1 + 2 + 3 + 4 + 5)/5 = 3.$$

The average value of Y is:

$$\overline{Y} = (2 + 4 + 1 + 6 + 5)/5 = 3.6.$$

The standard deviation of X is:

$$\sigma_X = \sqrt{((1-3)^2 + (2-3)^2 + (3-3)^2 + (4-3)^2 + (5-3)^2)/5} = 1.414.$$

The standard deviation of Y is:

$$\sigma_Y = \sqrt{((2-3.6)^2 + (4-3.6)^2 + (1-3.6)^2 + (6-3.6)^2 + (5-3.6)^2)/5} = 1.816.$$

Then, the covariance of the two variables needs to be calculated. The covariance is calculated as:

$$\text{cov}(X, Y) = \left(\sum_{i=1}^{n} \left((X_i - \overline{X})(Y_i - \overline{Y})\right)\right)/n.$$

Substituting the data into the Equation, to obtain:

$$\text{cov}(X, Y) = ((1-3)(2-3.6) + (2-3)(4-3.6) +$$
$$(3-3)(1-3.6) + (4-3)(6-3.6) + (5-3)*(5-3.6))/5 = 0.8.$$

Finally, an equation for the Pearson correlation coefficient may be used to calculate the correlation between the two variables:

Pearson correlation coefficient: $\rho = \text{cov}(X,Y)/(\sigma_X * \sigma_Y)$

Substituting the data into the Equation, to obtain:

Pearson correlation coefficient: $\rho = 0.8/(1.414*1.816)$
$= 0.316.$

Thus, based on the data in this example, the Pearson correlation coefficient $\rho$ between X and Y is 0.316.

The Pearson algorithm can quickly and accurately calculate the correlation between vectors, alleviating the amount of computation, thus improving the speed of coding.

In some alternative implementations of the present embodiment, the adjacent PUs include at least one of: $A_1$ representing a lowest PU to the left of the current PU, $B_1$ representing a rightmost PU above the current PU, $B_0$ representing a closest PU to an upper right of the current PU, $A_0$ representing a closest PU to a lower left of the current PU, and $B_2$ representing a closest PU to an upper left of the current PU. As shown in FIG. 3a, selecting 5 adjacent PUs instead of all adjacent PUs may reduce the amount of computation, and the selected adjacent PUs are optimized and are frequently selected in existing technology. Therefore, a part of the algorithm of the existing merge mv may be followed to save costs and also ensure an accuracy of predicted MVs.

In some alternative implementations of the present embodiment, the method further includes: acquiring temporal motion vectors of PUs at identical locations as the current PU in the predetermined number of reference frames; performing scaling adjustment on each temporal motion vector according to a positional relationship between each reference frame and a current frame to obtain temporal candidate motion vectors of the predetermined number; and calculating an average value of the temporal candidate motion vectors of the predetermined number as a temporal motion vector of the current PU.

Figure 3B:
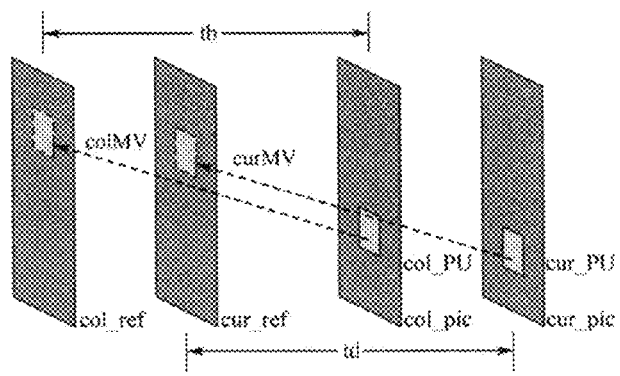

As shown in FIG. 3b, unlike the space domain, a temporal candidate list cannot directly use motion information of a candidate block, which needs to be adjusted in corresponding scaling according to its positional relationship with a reference image.

cur_PU represents the current PU, col_PU is the PU at the identical location (co-location image) as the current PU, td represents a distance between a current image cur_pic and the reference image cur_ref, and tb represents a distance between a co-location image col_pic and the reference image col_ref. Then, the temporal candidate MV of the current PU may be calculated by using the following equation:

$$curMV = \frac{td}{tb} colMV$$

where, colMV is the MV of the co-location PU.

Figure 3C:
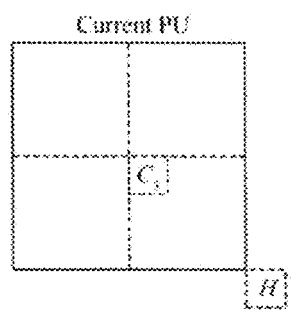

The time domain is specified in HEVC to provide at most one candidate MV, which is obtained by scaling the MV of the co-location PU at location H in FIG. 3c. If the co-location PU at location H is not available, it may be replaced by a co-location PU at location C3, as shown in FIG. 3c.

Embodiments of the present disclosure performs smoothing on the temporal motion vector of the current PU obtained by using the above method, and calculates the average value based thereon and together with the MVs at the identical locations in the predetermined number of reference frames to obtain a smoothed temporal MV of the current PU. The smoothed MV can obtain better quality encoded images.

In some alternative implementations of the present embodiment, the predetermined number is a size of a smallest group of images. Based on the size of miniGOP for calculation, a total number of mvs put therein is the same as the number of frames. The quality of coding may be ensured while improving the efficiency of coding.

In some alternative implementations of the present embodiment, the determining a priority of an adjacent PU corresponding to each motion vector subset according to the correlation in descending order, includes: in case of equal correlations, setting the priorities of the adjacent PUs in an order of $A_1 \rightarrow B_1 \rightarrow B_0 \rightarrow A_0 \rightarrow B_2$. Setting the priorities in the order of building the candidate list may improve the efficiency of coding.

In some alternative implementations of the present embodiment, if the current frame is a bi-directional prediction interpolated encoded frame, the predetermined number of reference frames includes a frame preceding the current frame and a frame following the current frame. For B Slice, there is no need to use a combinatorial list, which may reduce the amount of computation and improve the speed of coding.

In some alternative implementations of the present embodiment, the method further includes: creating a candidate list of motion vectors for the current PU, where each motion vector in the candidate list corresponds to one adjacent PU, and each adjacent PU has an index number; and transferring the index number of a PU at a target location in the candidate list to an encoder. There is no need transfer the MV information, only the index number needs to be transferred, and a decoder may obtain the MV information through motion inference, thus reducing the amount of data transmission, and reducing a network transmission pressure.

In some alternative implementations of the present embodiment, if the current PU is an intra-frame block, the motion vector of the current PU is 0. After completing a whole pattern judgement, if it is found that the current frame should be intra-frame encoded, the motion vector of the current PU is set to 0. This may not affect the MV calculation of PUs of other frames.

Figure 4:
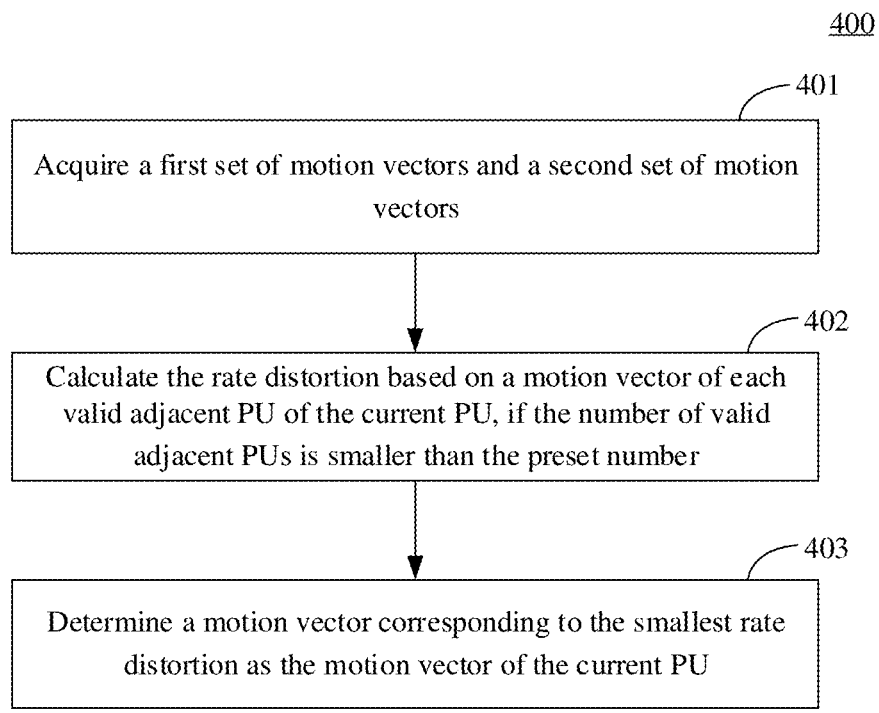
FIG. 4 is a flowchart of a method for predicting motion vector for inter-frame encoding according to another embodiment of the present disclosure.

With further reference to FIG. 4, a flow 400 of a method for predicting motion vector for inter-frame encoding according to another embodiment of the present disclosure is illustrated. The flow 400 of the method for predicting motion vector for inter-frame encoding includes the following steps.

Step 401, acquiring a first set of motion vectors and a second set of motion vectors.

In the present embodiment, an executing body (e.g., the server shown in FIG. 1) of the method for predicting motion vector for inter-frame encoding may acquire a set of motion vectors of different PUs known to be calculated for each frame. A current PU is a PU for which a MV is to be calculated. Calculating the MV of the current PU needs to intercept a first set of motion vectors and a second set of motion vectors from the above set of motion vectors. Here, the first set of motion vectors includes the motion vector of the current PU and motion vectors of PUs at identical locations as the current PU in a predetermined number of reference frames, and the second set of motion vectors includes a motion vector of an adjacent PU adjacent to the current PU and motion vectors of PUs at identical locations as the adjacent PU in the predetermined number of reference frames.

Step 402, calculating the rate distortion based on a motion vector of each valid adjacent PU of the current PU, if the number of valid adjacent PUs is smaller than the preset number.

In the present embodiment, if the number of valid adjacent PUs is smaller than the preset number, the method in steps 202-205 cannot be used to calculate the motion vector of the current PU. Instead, a MV candidate list is built for the current PU. Traversing candidate MVs to calculate the rate distortion of each candidate MV. The Lagrangian optimization method may be used to calculate the rate distortion.

Step 403, determining a motion vector corresponding to the smallest rate distortion as the motion vector of the current PU.

In the present embodiment, the MV corresponding to the smallest rate distortion is selected as the optimal MV. The encoder transmits the index of the optimal MV in the candidate list.

The method in the present embodiment may be used to calculate the MV when the current PU is at the edge of an image. For a PU in the middle part, the method described in flow 200 may be used to calculate the MV. By combining the two calculation methods, video coding may be performed quickly and accurately, thus ensuring the quality of video compression.

Figure 5:
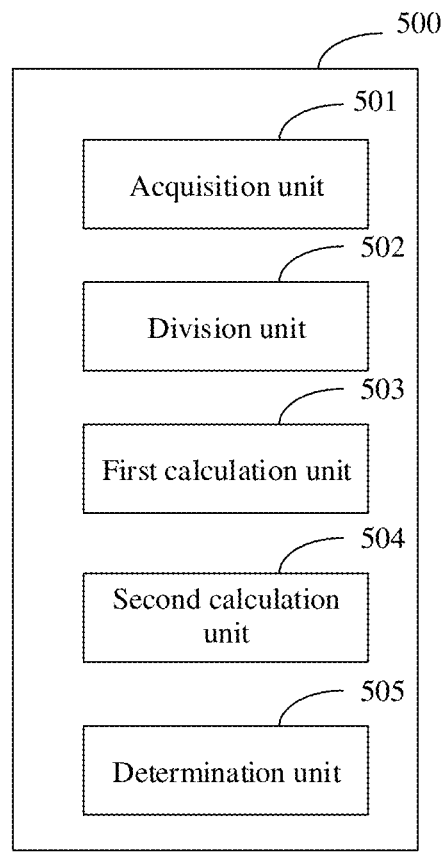
FIG. 5 is a schematic structural diagram of an apparatus for predicting an motion vector for inter-frame encoding according to an embodiment of the present disclosure.

With further reference to FIG. 5, as an implementation of the method shown in the above figures, an embodiment of the present disclosure provides an apparatus for predicting an inter-frame encoded motion vector, and the apparatus embodiment corresponds to the method embodiment shown in FIG. 2. The apparatus may be applied to various electronic devices.

As shown in FIG. 5, an apparatus 500 for predicting motion vector for inter-frame encoding of the present embodiment includes: an acquisition unit 501, a division unit 502, a first calculation unit 503, a second calculation unit 504, and a determination unit 505. The acquisition unit 501 is configured to acquire a first set of motion vectors and a second set of motion vectors, where the first set of motion vectors includes a motion vector of a current PU and motion vectors of PUs, that are at identical locations as the current PU, in a predetermined number of reference frames, and the second set of motion vectors includes a motion vector of at least one adjacent PU of the current PU and motion vectors of PUs, that are at identical locations as the at least one adjacent PU, in the predetermined number of reference frames. The division unit 502 is configured to divide, in response to the number of valid adjacent PUs being greater than or equal to a preset number, the second set of motion vectors into at least one motion vector subset according to locations of the PUs. The first calculation unit 503 is configured to calculate a correlation between the first set of motion vectors and each motion vector subset respectively, and determine a priority of an adjacent PU corresponding to each motion vector subset according to the correlation in descending order. The second calculation unit 504 is configured to calculate, sequentially according to the priority in descending order, a rate distortion based on a motion vector of each adjacent PU, and stop calculating until a rate distortion smaller than a predetermined threshold is obtained by the calculating. The determination unit 505 is configured to determine a motion vector of an adjacent PU used when the rate distortion smaller than the predetermined threshold is obtained as the motion vector of the current PU.

In the present embodiment, in the apparatus 500 for predicting motion vector for inter-frame encoding, for the specific processing of the acquisition unit 501, the division unit 502, the first calculation unit 503, the second calculation unit 504, and the determination unit 505, reference may be made to step 201, step 202, step 203, step 204, step 205 in the corresponding embodiment of FIG. 2 respectively.

In some alternative implementations of the present embodiment, the acquisition unit 501 is further configured to: calculate an average value of the motion vectors of the PUs, that are at identical locations as the current PU, in the predetermined number of reference frames, and using the average value as the motion vector of the current PU.

In some alternative implementations of the present embodiment, the apparatus 500 further includes a restore unit (not shown in the figure), configured to: calculate the rate distortion based on a motion vector of each valid adjacent PU of the current PU, in response to the number of valid adjacent PUs being smaller than the preset number; and determine a motion vector corresponding to a smallest rate distortion as the motion vector of the current PU.

In some alternative implementations of the present embodiment, the first calculation unit 503 is further configured to: for each motion vector subset, converting according to a predetermined order motion vectors in the motion vector subset into a one-dimensional first vector, convert according to the predetermined order the first set of motion vectors into a one-dimensional second vector, and calculate a correlation between the first vector and the second vector according to a Pearson algorithm.

In some alternative implementations of the present embodiment, the adjacent PUs include at least one of: $A_1$ representing a lowest PU to the left of the current PU, $B_1$ representing a rightmost PU above the current PU, $B_0$ representing a closest PU to an upper right of the current PU, $A_0$ representing a closest PU to a lower left of the current PU, and $B_2$ representing a closest PU to an upper left of the current PU.

In some alternative implementations of the present embodiment, the apparatus 500 further includes a temporal calculation unit (not shown in the figure), configured to: acquire temporal motion vectors of PUs at the identical locations as the current PU in the predetermined number of reference frames; perform scaling adjustment on each temporal motion vector according to a positional relationship between the each reference frame and a current frame, to obtain temporal candidate motion vectors of the predetermined number; and calculate an average value of the temporal candidate motion vectors of the predetermined number as a temporal motion vector of the current PU.

In some alternative implementations of the present embodiment, the predetermined number is a size of a smallest group of images.

In some alternative implementations of the present embodiment, the first calculation unit 503 is further configured to: in case of equal correlations, set the priorities of the adjacent PUs in an order of $A_1 \rightarrow B_1 \rightarrow B_0 \rightarrow A_0 \rightarrow B_2$.

In some alternative implementations of the present embodiment, in response to a current frame being a bi-directional prediction interpolated encoded frame, the predetermined number of reference frames includes a frame preceding the current frame and a frame following the current frame.

In some alternative implementations of the present embodiment, the determination unit 505 is further configured to: build a candidate list of motion vectors for the current PU, where each motion vector in the candidate list corresponds to an adjacent PU, and each adjacent PU has an index number; and transfer the index number of a PU at a target location in the candidate list to an encoder.

In some alternative implementations of the present embodiment, in response to the current PU is an intra-frame block, the motion vector of the current PU is 0.

In the technical solution of the present disclosure, the collection, storage, use, processing, transfer, provision, and disclosure of personal information of a user involved are in conformity with relevant laws and regulations, and do not violate public order and good customs.

According to an embodiment of the present disclosure, further provides an electronic device, a readable storage medium, and a computer program product.

An electronic device, including: at least one processor; and a memory, communicatively connected to the at least one processor; where, the memory stores instructions executable by the at least one processor, the instructions being executed by the at least one processor to enable the at least one processor to perform the method in flow 200.

A non-transitory computer readable storage medium storing a computer instruction, where, the computer instruction is used to cause the computer to perform the method in flow 200.

A computer program product, including a computer program, the computer program, when executed by a processor, implements the method in flow 200.

Figure 6:
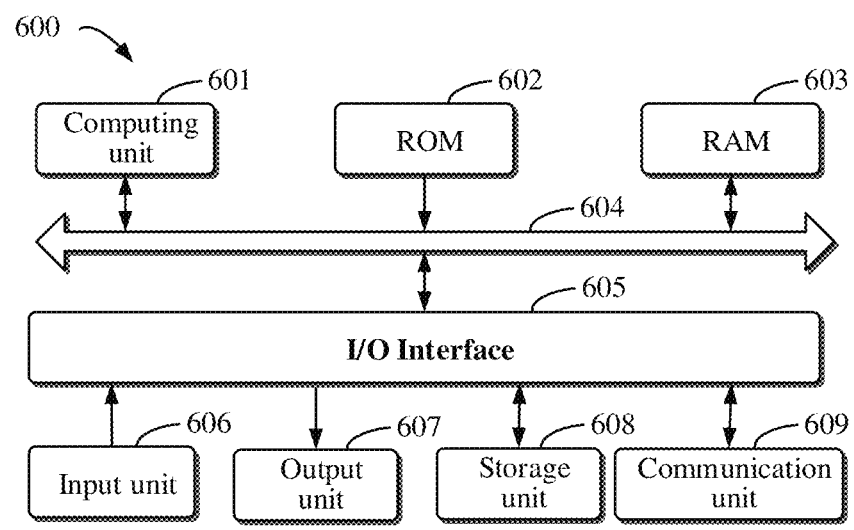
FIG. 6 is a schematic structural diagram of a computer system of an electronic device suitable for implementing embodiments of the present disclosure.

FIG. 6 shows a schematic block diagram of an example electronic device 600 that may be configured to implement embodiments of the present disclosure. The electronic device is intended to represent various forms of digital computers, such as a laptop, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 6, the device 600 includes a computing unit 601, which may execute various appropriate actions and processes in accordance with a computer program stored in a read-only memory (ROM) 602 or a computer program loaded into a random-access memory (RAM) 603 from a storage unit 608. The RAM 603 may further store various programs and data required by operations of the device 600. The computing unit 601, the ROM 602, and the RAM 603 are connected to each other through a bus 604. An input/output (I/O) interface 605 is also connected to the bus 604.

A plurality of components in the device 600 is connected to the I/O interface 605, including: an input unit 606, such as a keyboard and a mouse; an output unit 607, such as various types of displays and speakers; the storage unit 608, such as a magnetic disk and an optical disk; and a communication unit 609, such as a network card, a modem, and a wireless communication transceiver. The communication unit 609 allows the device 600 to exchange information/data with other devices via a computer network such as the Internet and/or various telecommunication networks.

The computing unit 601 may be various general-purpose and/or special-purpose processing components having a processing power and a computing power. Some examples of the computing unit 601 include, but are not limited to, a central processing unit (CPU), a graphics processing unit (GPU), various special-purpose artificial intelligence (AI) computing chips, various computing units running a machine learning model algorithm, a digital signal processor (DSP), and any appropriate processor, controller, microcontroller, or the like. The computing unit 601 executes various methods and processes described above, such as the method for predicting motion vector for inter-frame encoding. For example, in some embodiments, the method for predicting motion vector for inter-frame encoding may be implemented as a computer software program that is tangibly included in a machine-readable medium, such as the storage unit 608. In some embodiments, some or all of the computer programs may be loaded and/or installed onto the device 600 via the ROM 602 and/or the communication unit 609. When the computer program is loaded into the RAM 603 and executed by the computing unit 601, one or more steps of the method for predicting motion vector for inter-frame encoding described above may be executed. Alternatively, in other embodiments, the computing unit 601 may be configured to execute the method for predicting motion vector for inter-frame encoding by any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The Server could be a cloud server, also known as cloud computing server or cloud host, which is a host product in the cloud computing service system to solve the defects of difficult management and weak business scalability in the traditional physical host and Virtual Private server (VPS, Virtual Private Server) service. The server may also be classified as distributed system servers, or a server that combines a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for predicting a motion vector for inter-frame encoding, comprising:
    acquiring a first set of motion vectors and a second set of motion vectors, wherein the first set of motion vectors comprises a motion vector of a current prediction unit (PU) and motion vectors of PUs, that are at identical locations as the current PU, in a predetermined number of reference frames, and the second set of motion vectors comprises a motion vector of at least one adjacent PU of the current PU and motion vectors of PUs, that are at identical locations as the at least one adjacent PU, in the predetermined number of reference frames;
    dividing, in response to a number of valid adjacent PUs being greater than or equal to a preset number, the second set of motion vectors into at least one motion vector subset according to locations of the PUs;
    calculating a correlation between the first set of motion vectors and each motion vector subset respectively, and determining a priority of an adjacent PU corresponding to each motion vector subset according to the correlation in descending order;
    calculating, sequentially according to the priority in descending order, a rate distortion based on a motion vector of each adjacent PU, and stop calculating until a rate distortion smaller than a predetermined threshold is obtained; and
    determining a motion vector of an adjacent PU used when the rate distortion smaller than the predetermined threshold is obtained as the motion vector of the current PU.

2. The method according to claim 1, wherein, before calculating the correlation between the first set of motion vectors and each motion vector subset respectively, the method further comprises:
    calculating an average value of the motion vectors of the PUs, that are at identical locations as the current PU, in the predetermined number of reference frames, and using the average value as the motion vector of the current PU.

3. The method according to claim 1, wherein the method further comprises:
    calculating the rate distortion based on a motion vector of each valid adjacent PU of the current PU, in response to the number of valid adjacent PUs being smaller than the preset number; and
    determining a motion vector corresponding to a smallest rate distortion as the motion vector of the current PU.

4. The method according to claim 1, wherein calculating the correlation between the first set of motion vectors and each motion vector subset respectively, comprises:
    for each motion vector subset, converting according to a predetermined order motion vectors in the motion vector subset into a one-dimensional first vector, converting according to the predetermined order the first set of motion vectors into a one-dimensional second vector, and calculating a correlation between the first vector and the second vector according to a Pearson algorithm.

5. The method according to claim 1, wherein, the adjacent PUs comprise at least one of: $A_1$ representing a lowest PU to the left of the current PU, $B_1$ representing a rightmost PU above the current PU, $B_0$ representing a closest PU to an upper right of the current PU, $A_0$ representing a closest PU to a lower left of the current PU, and $B_2$ representing a closest PU to an upper left of the current PU.

6. The method according to claim 1, wherein the method further comprises:
    acquiring temporal motion vectors of PUs at the identical locations as the current PU in the predetermined number of reference frames;
    performing scaling adjustment on each temporal motion vector according to a positional relationship between the each reference frame and a current frame, to obtain temporal candidate motion vectors of the predetermined number; and
    calculating an average value of the temporal candidate motion vectors of the predetermined number as a temporal motion vector of the current PU.

7. The method according to claim 1, wherein the predetermined number is a size of a smallest group of images.

8. The method according to claim 5, wherein determining the priority of an adjacent PU corresponding to each motion vector subset according to the correlation in descending order, comprises:
    in case of equal correlations, setting priorities of the adjacent PUs in an order of $A_1 \rightarrow B_1 \rightarrow B_0 \rightarrow A_0 \rightarrow B_2$.

9. The method according to claim 1, wherein in response to a current frame being a bi-directional prediction interpolated encoded frame, the predetermined number of reference frames comprises a frame preceding the current frame and a frame following the current frame.

10. The method according to claim 1, wherein the method further comprises:
    building a candidate list of motion vectors for the current PU, wherein each motion vector in the candidate list corresponds to an adjacent PU, and each adjacent PU has an index number; and
    transferring the index number of a PU at a target location in the candidate list to an encoder.

11. The method according to claim 1, wherein in response to the current PU being an intra-frame block, the motion vector of the current PU is 0.

12. An apparatus for predicting motion vector for inter-frame encoding, comprising:
    at least one processor; and
    a memory, communicating with the at least one processor, wherein the memory stores instructions executable by the at least one processor, and the instructions, when executed by the at least one processor, enable the at least one processor to perform operations, the operations comprising:

acquiring a first set of motion vectors and a second set of motion vectors, wherein the first set of motion vectors comprises a motion vector of a current prediction unit (PU) and motion vectors of PUs, that are at identical locations as the current PU, in a predetermined number of reference frames, and the second set of motion vectors comprises a motion vector of at least one adjacent PU of the current PU and motion vectors of PUs, that are at identical locations as the at least one adjacent PU, in the predetermined number of reference frames;

dividing, in response to a number of valid adjacent PUs being greater than or equal to a preset number, the second set of motion vectors into at least one motion vector subset according to locations of the PUs;

calculating a correlation between the first set of motion vectors and each motion vector subset respectively, and determining a priority of an adjacent PU corresponding to each motion vector subset according to the correlation in descending order;

calculating, sequentially according to the priority in descending order, a rate distortion based on a motion vector of each adjacent PU, and stop calculating until a rate distortion smaller than a predetermined threshold is obtained; and determining a motion vector of an adjacent PU used when the rate distortion smaller than the predetermined threshold is obtained as the motion vector of the current PU.

13. The apparatus according to claim 12, wherein before calculating the correlation between the first set of motion vectors and each motion vector subset respectively, the operations further comprise:

calculating an average value of the motion vectors of the PUs, that are at identical locations as the current PU, in the predetermined number of reference frames, and using the average value as the motion vector of the current PU.

14. The apparatus according to claim 12, wherein the operations further comprise:

calculating the rate distortion based on a motion vector of each valid adjacent PU of the current PU, in response to the number of valid adjacent PUs being smaller than the preset number; and determining a motion vector corresponding to a smallest rate distortion as the motion vector of the current PU.

15. The apparatus according to claim 12, wherein calculating the correlation between the first set of motion vectors and each motion vector subset respectively, comprises:

for each motion vector subset, converting according to a predetermined order motion vectors in the motion vector subset into a one-dimensional first vector, converting according to the predetermined order the first set of motion vectors into a one-dimensional second vector, and calculating a correlation between the first vector and the second vector according to a Pearson algorithm.

16. The apparatus according to claim 12, wherein, the adjacent PUs comprise at least one of: $A_1$ representing a lowest PU to the left of the current PU, $B_1$ representing a rightmost PU above the current PU, $B_0$ representing a closest PU to an upper right of the current PU, $A_0$ representing a closest PU to a lower left of the current PU, and $B_2$ representing a closest PU to an upper left of the current PU.

17. The apparatus according to claim 12, wherein the operations further comprise:

acquiring temporal motion vectors of PUs at the identical locations as the current PU in the predetermined number of reference frames;

performing scaling adjustment on each temporal motion vector according to a positional relationship between the each reference frame and a current frame, to obtain temporal candidate motion vectors of the predetermined number; and calculating an average value of temporal candidate motion vectors of the predetermined number as a temporal motion vector of the current PU.

18. The apparatus according to claim 12, wherein the predetermined number is a size of a smallest group of images.

19. The apparatus according to claim 16, wherein determining the priority of an adjacent PU corresponding to each motion vector subset according to the correlation in descending order, comprises:

in case of equal correlations, set priorities of the adjacent PUs in an order of $A_1 \rightarrow B_1 \rightarrow B_0 \rightarrow A_0 \rightarrow B_2$.

20. A non-transitory computer readable storage medium storing computer instructions, wherein, the computer instructions are used to cause the computer to perform operations, the operations comprising:

acquiring a first set of motion vectors and a second set of motion vectors, wherein the first set of motion vectors comprises a motion vector of a current prediction unit (PU) and motion vectors of PUs, that are at identical locations as the current PU, in a predetermined number of reference frames, and the second set of motion vectors comprises a motion vector of at least one adjacent PU of the current PU and motion vectors of PUs, that are at identical locations as the at least one adjacent PU, in the predetermined number of reference frames;

dividing, in response to a number of valid adjacent PUs being greater than or equal to a preset number, the second set of motion vectors into at least one motion vector subset according to locations of the PUs;

calculating a correlation between the first set of motion vectors and each motion vector subset respectively, and determining a priority of an adjacent PU corresponding to each motion vector subset according to the correlation in descending order;

calculating, sequentially according to the priority in descending order, a rate distortion based on a motion vector of each adjacent PU, and stop calculating until a rate distortion smaller than a predetermined threshold is obtained; and determining a motion vector of an adjacent PU used when the rate distortion smaller than the predetermined threshold is obtained as the motion vector of the current PU.

* * * * *